(12) United States Patent
Dahl et al.

(10) Patent No.: US 6,341,480 B1
(45) Date of Patent: Jan. 29, 2002

(54) CUTTING UNIT FOR A RIDING MOWER

(75) Inventors: Gunnar Dahl, Ödeshög; Mikael Edén, Kalmar, both of (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 09/334,283

(22) Filed: Jun. 16, 1999

(30) Foreign Application Priority Data

Jun. 26, 1998 (SE) ............................................... 9802284

(51) Int. Cl.[7] ........................ A01D 34/03; A01D 34/43; A01D 34/64
(52) U.S. Cl. ................................. 56/15.9; 56/DIG. 22
(58) Field of Search .............................. 56/15.2, 15.9, 56/15.6, 15.8, 16.2, 16.3, 214, 208, DIG. 9, DIG. 22; 72/457, 456; 280/481, 481.3, 43.12, 43.23

(56) References Cited

U.S. PATENT DOCUMENTS

| 1,651,579 | A | * | 12/1927 | Bolens | 56/15.8 |
| 3,015,927 | A | * | 1/1962 | Caldwell | 56/15.9 |
| 3,077,065 | A | * | 2/1963 | Samways et al. | 56/15.8 |
| 3,280,919 | A | * | 10/1966 | Bunting et al. | 172/460 |
| 4,212,144 | A | * | 7/1980 | Raineri | 56/15.8 |
| 4,310,997 | A | * | 1/1982 | Streicher | 56/15.9 |
| 4,313,295 | A | * | 2/1982 | Hansen et al. | 56/15.8 |
| 4,442,660 | A | * | 4/1984 | Kuhn | 56/15.9 |
| 4,490,966 | A | * | 1/1985 | Kuhn et al. | 56/15.9 |
| 4,563,019 | A | * | 1/1986 | Kuhn et al. | 280/481 |
| 4,738,327 | A | * | 4/1988 | Takei | 180/68.1 |
| 4,779,406 | A | | 10/1988 | Schroeder | |
| 4,829,754 | A | | 5/1989 | Shimamura et al. | |
| 4,930,801 | A | * | 6/1990 | Gillund | 280/481 |
| 5,065,568 | A | * | 11/1991 | Braun et al. | 56/14.9 |
| 5,079,907 | A | | 1/1992 | Sameshima et al. | |
| 5,459,984 | A | * | 10/1995 | Reichen et al. | 56/7 |
| 5,475,971 | A | * | 12/1995 | Good et al. | 56/14.9 |
| 5,816,035 | A | * | 10/1998 | Schick | 56/15.2 |
| 5,927,055 | A | * | 7/1999 | Ferree et al. | 56/15.9 |

FOREIGN PATENT DOCUMENTS

| EP | 0213096 | * | 7/1986 | ................. 56/15.8 |
| EP | 0 213 096 B1 | | 5/1991 | |
| SE | 454 039 | | 3/1988 | |

* cited by examiner

Primary Examiner—Thomas B. Will
Assistant Examiner—Árpád Fábián Kovács
(74) Attorney, Agent, or Firm—Pearne & Gordon LLP

(57) ABSTRACT

A device for a riding mower having a wheel born chassis (11,12) intended to support the operator, an engine (14) for driving at least one wheel (13) and cutting knives (31) arranged in a front mounted cutting unit (17). The cutting unit is placed such that at least a part of the cutting unit is situated close beneath the front part of the chassis. The mower is provided with a first pivot (26) arranged in front of the chassis and about which the cutting unit (17) is turnably arranged. The cutting unit is adapted to move forward whereby a support (55) arranged on the cutting unit engages the ground and the rear part of the cutting unit is then moved forwardly at the same time as the front part of the cutting unit is turned upwards about the first pivot (26) to a maintenance position.

6 Claims, 6 Drawing Sheets

CUTTING UNIT FOR A RIDING MOWER

BACKGROUND OF THE INVENTION

1. Field of the Invention

The present invention relates to a device for a riding mower having a wheel-born chassis supporting the operator, an engine for driving at least one of the wheels and at least one cutting means arranged in a front mounted cutting unit that is placed such that at least a part of the cutting unit is situated close beneath the front part of the chassis.

2. Description of the Related Art

Riding mowers of the type mentioned above are previously known, see for instance EP 213096. Such mowers comprise a front part and a rear part. The front part supports the operator, the cutting unit, which is placed in front of the two front wheels, and the engine. The rear part supports the two rear wheels. The two parts are pivotally arranged with respect to one another about a vertical axis and a horizontal axis oriented in the direction of movement. This design gives a neat and easily driven mower having a minimal turning radius. Also, the mower s cutting unit is positioned such that the operator has a good view of the area being cut.

In order to achieve a vehicle that is as compact as possible and to minimize the total length of the mower, the cutting unit is placed close to the two front wheels. However the necessary space for the legs of the operator and the foot control means demands that the chassis extends forward such that it is partly placed above the cutting unit. This means that the lower side of the cutting unit, without being heavily demounted, is difficult to reach for cleaning and maintenance.

It has, for other types of riding mowers with front mounted cutting units on the market, namely such mowers on which the cutting unit is placed completely in front of the chassis, see U.S. Pat. No. 5,079,907, been suggested to facilitate cleaning and maintenance by making the cutting unit foldable to a mainly vertical position. For this type of mower, a link arm mechanism is used that is fastened to the cutting unit at each side of the mower at the area of the front wheel axis. This means that the turning motion of the cutting unit, depending on the forwardly extending position of the cutting unit, can be made without the cutting unit being hindered by the chassis.

SUMMARY OF THE INVENTION

The present invention is directed toward an arrangement that removes the disadvantages mentioned above and makes it possible to move the cutting unit easily to such a position facilitating service and maintenance while maintaining a desirably compact structure.

In accordance with the present invention, cutting means are arranged at a front mounted cutting unit, and the cutting unit is placed such that at least a part of the cutting unit is situated beneath the front part of the chassis. Means are also provided for moving the cutting unit forward with respect to the chassis such that support means arranged on the rear part of the cutting unit engage the ground. The rear part of the cutting unit can then be moved forwards at the same time that the front part of the cutting unit is turned upwards about a first pivot to a maintenance position.

BRIEF DESCRIPTION OF THE DRAWINGS

These and further features of the invention will be apparent with reference to the following description and drawings, wherein.

DETAILED DESCRIPTION OF THE PREFERRED EMBODIMENT

Figure 1:
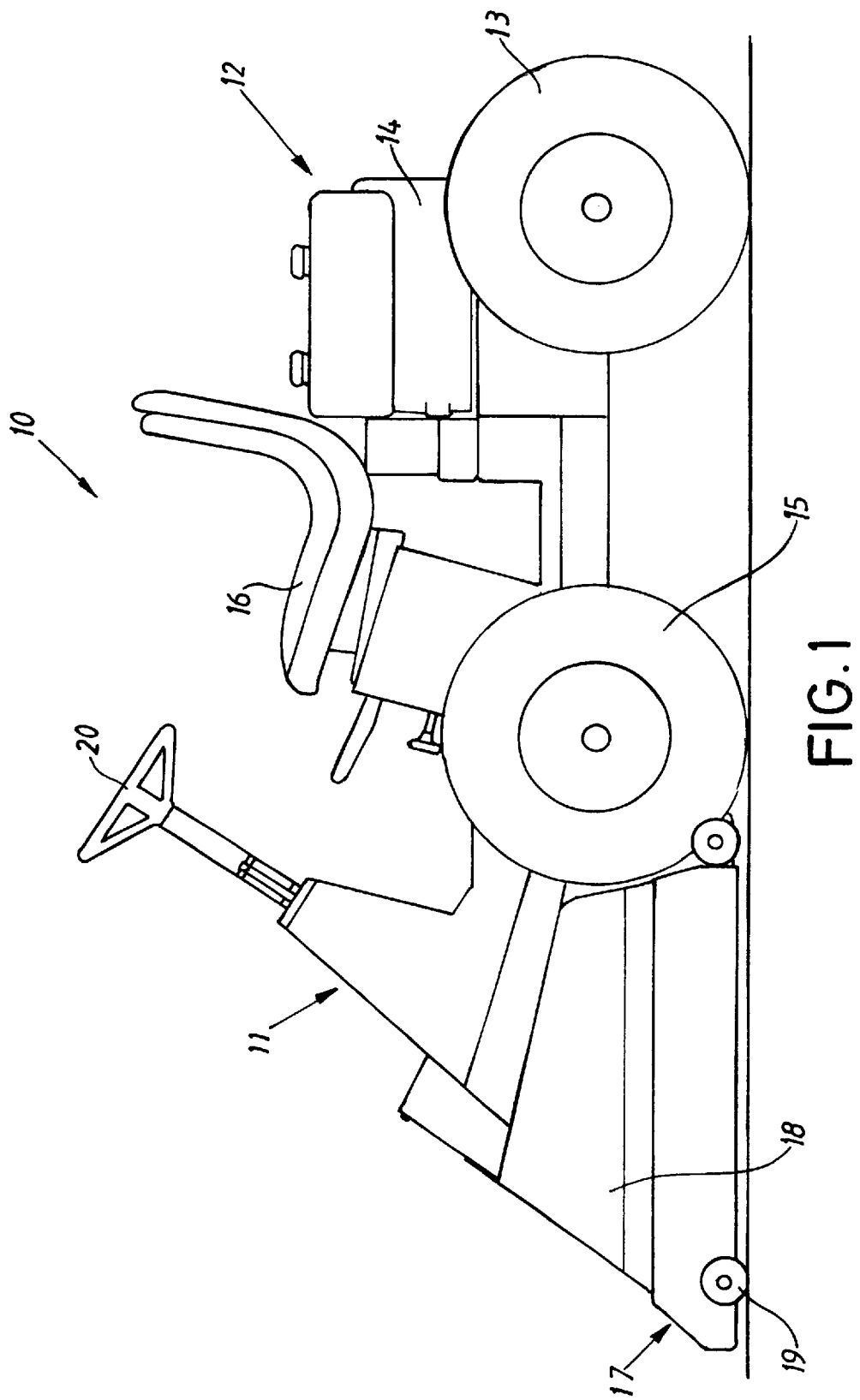
FIG. 1 is a side view illustrating a riding mower incorporating the present invention.
Figure 2:
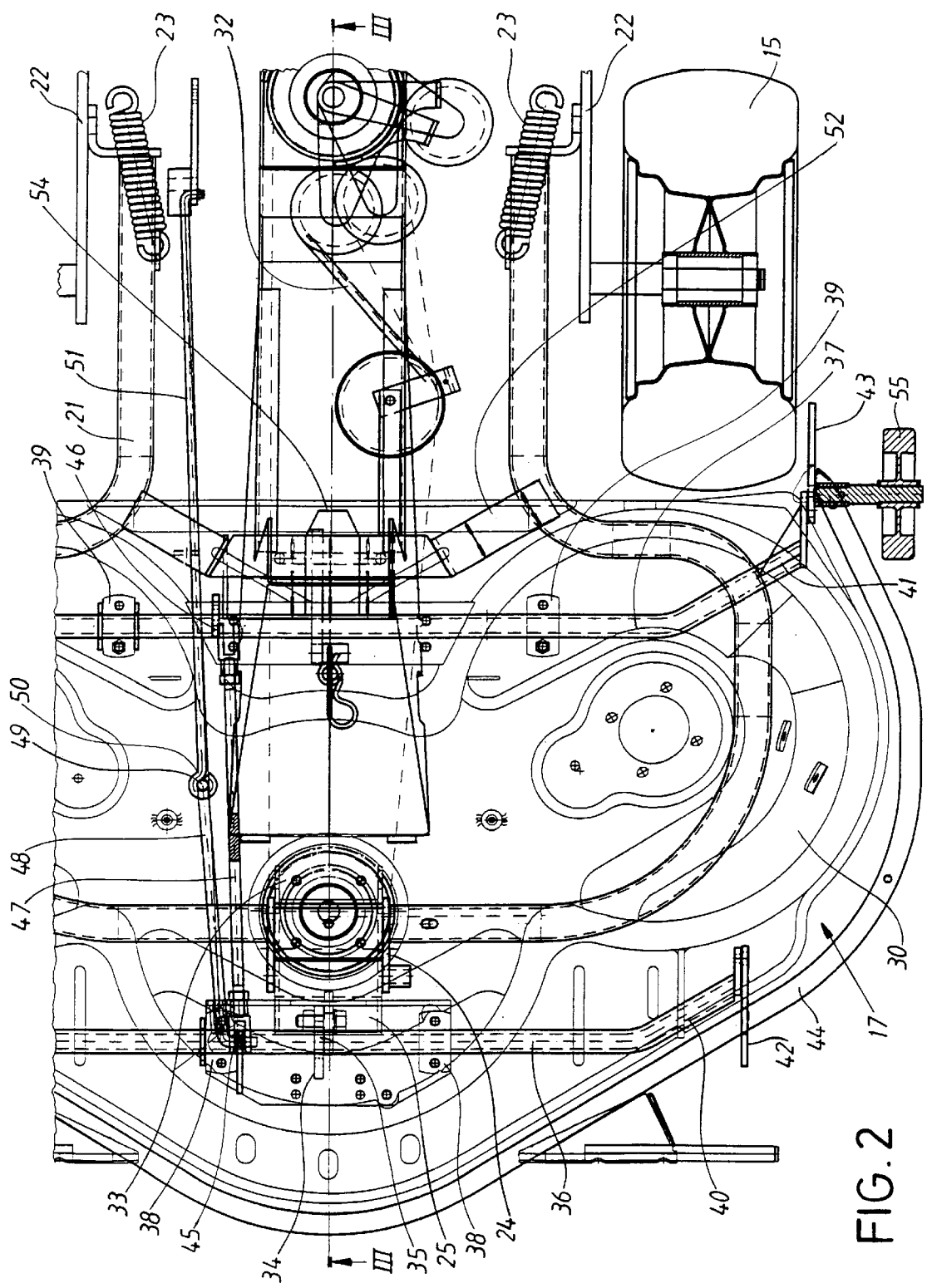
FIG. 2 is a plan view of a part of the cutting unit for the mower with its support system.

As shown in FIG. 1, a riding mower 10 includes a front chassis part 11 which, by means of a pivot (not shown), is turnably secured about a horizontal axis as well as a vertical axis to a rear chassis part 12. The rear chassis part is supported by two rear wheels 13. The mower is also provided with a drive unit 14, such as an internal combustion engine.

The front chassis part 11 is supported by two front wheels 15, and has a seat 16 for the operator and a cutting unit 17 which is partly covered by one or more protecting hoods 18. The cutting unit 17 is, at its front end, supported by two supporting rollers 19. The front chassis part 11 is also provided with necessary control means, such as a steering wheel 20, control means (not shown) for lowering and raising the cutting unit 17, and for adjustment of the cutting height, etc.

The cutting unit 17 is supported by a supporting frame 21 (FIGS. 2–6), which is turnably secured for vertical movement about a pivot point 22 arranged at the front chassis part 11. The supporting frame 21 is under the influence of two springs 23. The springs 23 are fastened to the front chassis part 11 and help lift the cutting unit 17. The supporting frame 21 can be raised and lowered by means of a lifting mechanism (not shown) in order to move the cutting unit between a raised transport position and a lowered cutting position.

A front part of the supporting frame 21 is provided with two side plates 24 that are fastened to a link arm 25 by means of a first pivot or hinge 26. The first hinge 26 permits a turning motion of the link arm 25 with respect to the supporting frame 21 about a horizontal axis arranged perpendicular to the driving direction. The link arm 25, which is directed obliquely downwards in front of the front chassis part 11, is provided with a through hole 27 arranged below and in front of the first hinge 26. The hole 27 is arranged to be positioned in line with openings 28 in the side plates 24 in order to lock the link arm 25 with respect to the supporting frame 21 by means of a locking pin 29.

The cutting unit 17 comprises an up-side-down trough-shaped hull 30 that, in a conventional manner, encloses several horizontal knives 31 arranged on several vertical shafts driven from the driving unit 14 by means of a drive belt 32 connected to a central drive belt 33 whose shaft by means of another drive belt (not shown) drives the other knives. The front part of the cutting unit 17 is, at its upper side, provided with a central upstanding lug 34 forming a second pivot 35 to which a lower end of the link arm 25 is turnably arranged.

The cutting unit 17 is, at its upper side, provided with a front transverse rod 36 and a rear transverse rod 37 that are turnably secured to the cutting unit at a front pivot point 38 and a rear pivot point 39, respectively. The rods 36, 37 are provided with bent end parts 40, 41 that are turnably arranged to front and rear brackets 42, 43 arranged on a support beam 44 extending about the cutting unit and supporting the support rollers 19. The two rods 36, 37 are connected to one another by a link arm system including first, second, and third link arms 45, 46, 47. The first link arm 45 is secured to the rod 36, the second link arm 46 is secured to the rod 37, and the third link arm 47 connects the first and second link arms 45, 46 to one another. Thus, the two transverse rods 36, 37 achieve a synchronous turning motion, which means that the cutting unit 17 is moved vertically parallel to the surface beneath. The first link arm 45 also supports a front rod 48 that has one end pivotally secured to the link arm 45. An opposite end of the front rod 48 is provided with a hook 49 that is removably connected to a loop 50 on a rear rod 51 that can be acted on to adjust the cutting unit 17 to a desired cutting height.

The support frame 21 is provided with a yoke 52 extending between two legs of the frame 21. A lower side of the yoke 52 is provided with a support 53 on which a tongue 54 normally rests. The tongue 54 extends from, and is fixed to, the rear transverse rod 37 and pivots together with the rod 37. Thus, the rear part of the cutting unit 17 is manually supported by the support 53. The support beam 44, which is placed on the cutting unit, also supports two support wheels 55 which might be removably arranged and which are placed at the rear part of the cutting unit and at each side thereof. The purpose of the supporting wheels will be described below.

The device operates in the following manner. Cutting takes place by lowering the cutting unit 17 toward the surface by means of the support beam 21 and manually controlled means (not shown) belonging to the beam which means that the supporting rollers 19 engage the surface. Since the tongue 54 rests on the support means 53, which is connected to the yoke 52 of the support beam 21, the rear part of the cutting unit 17 will be lifted up from the ground during the cutting operation. A suitable cutting height can be set by moving the rear rod 51 in its length direction by means of manually operated control means (not shown). Thus, moving the rod 51 means that the cutting unit is raised or lowered with respect to the supporting frame 21, this movement taking place with the cutting unit parallel to the ground. During cutting, the cutting unit can, because of the central support at the tongue 54 and the support means 53 and at the comparatively loose, centrally placed, bearing 35, turn somewhat about an axis which is parallel with the driving direction in order to take up slight variations in inclination of the ground. The ground inclination is also, in a conventional manner, taken up as a turning motion between the front and the rear chassis parts 11, 12.

Figure 3:
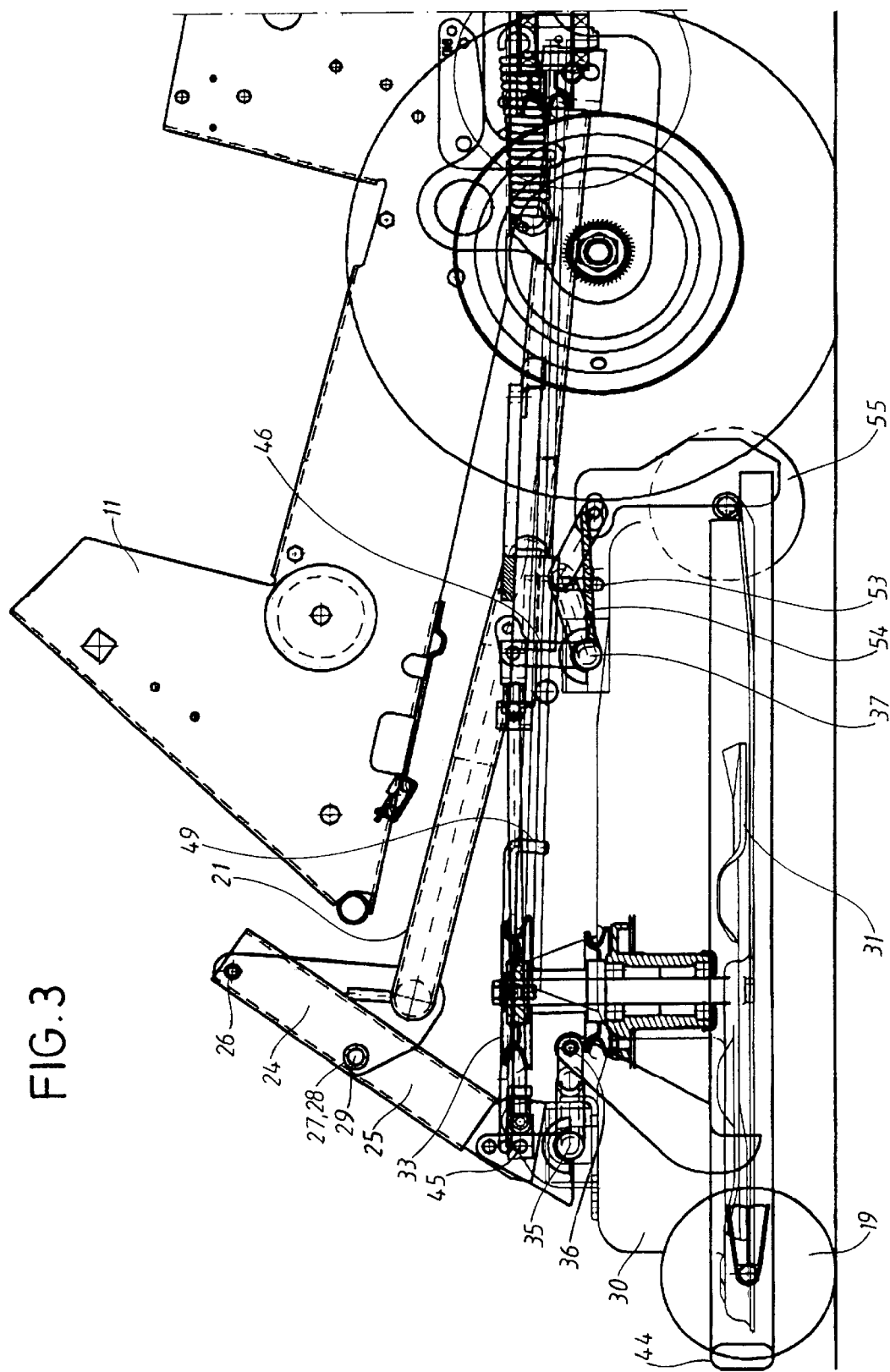
FIG. 3 is a vertical section as seen along line III—III in FIG. 2.
Figure 4:
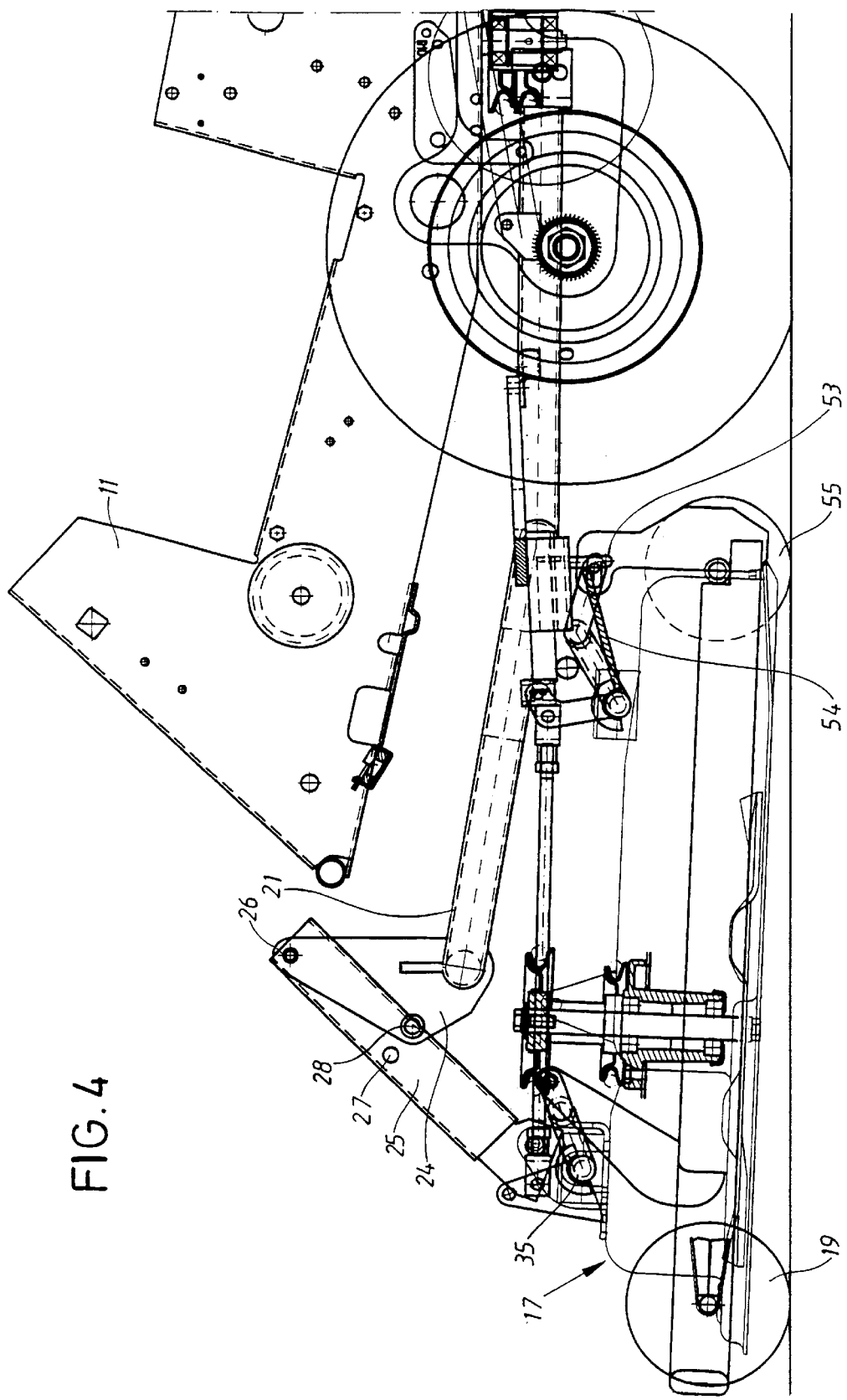
FIG. 4 is the same section as FIG. 3, but with the cutting unit in a first position before it is folded up.
Figure 5:
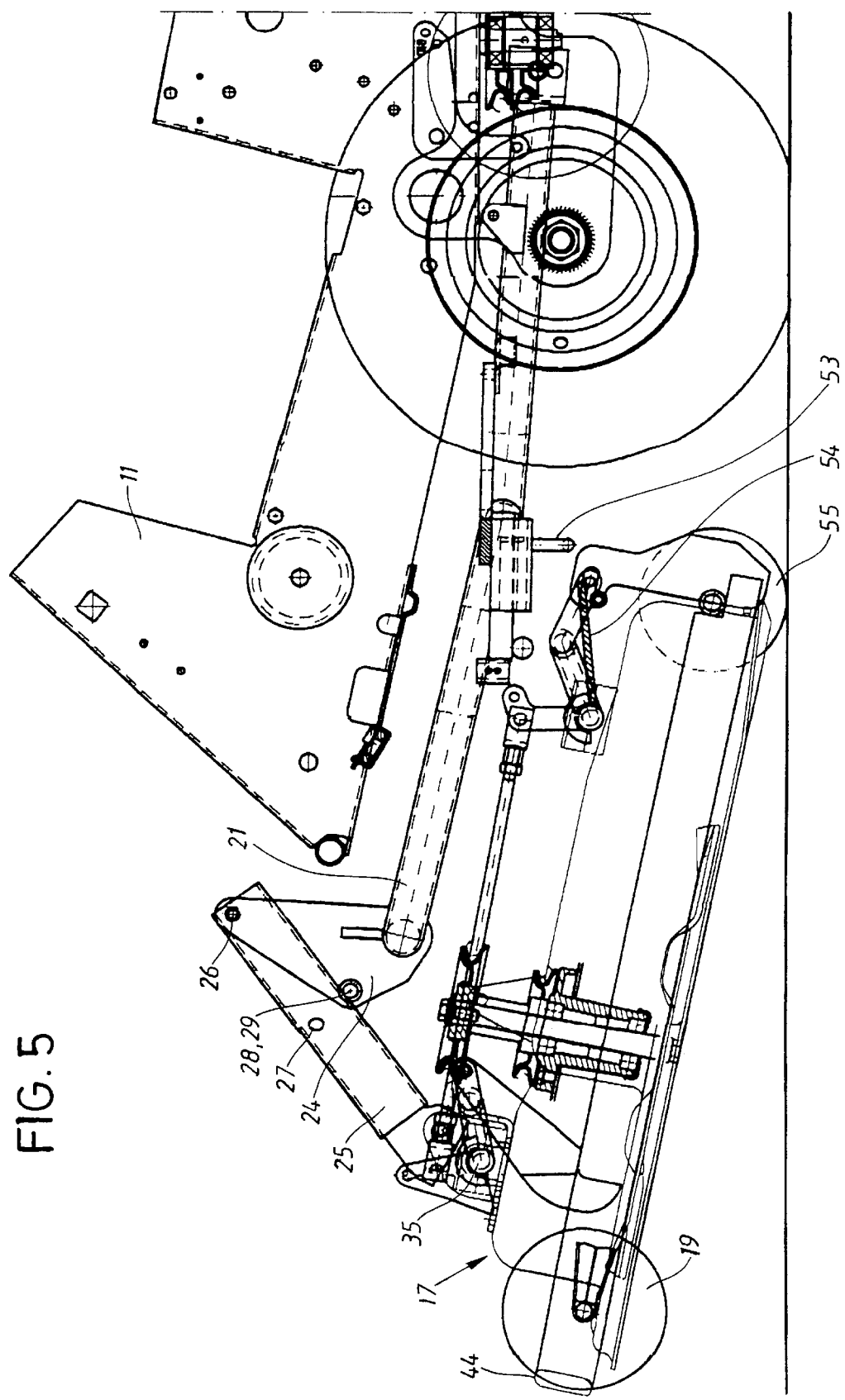
FIG. 5 shows the same section as FIGS. 3 and 4, but with the cutting unit in a partly folded up position; and, FIG. 6 shows the same section as in FIGS. 3–5, but with the cutting unit in a completely folded up position.
Figure 6:
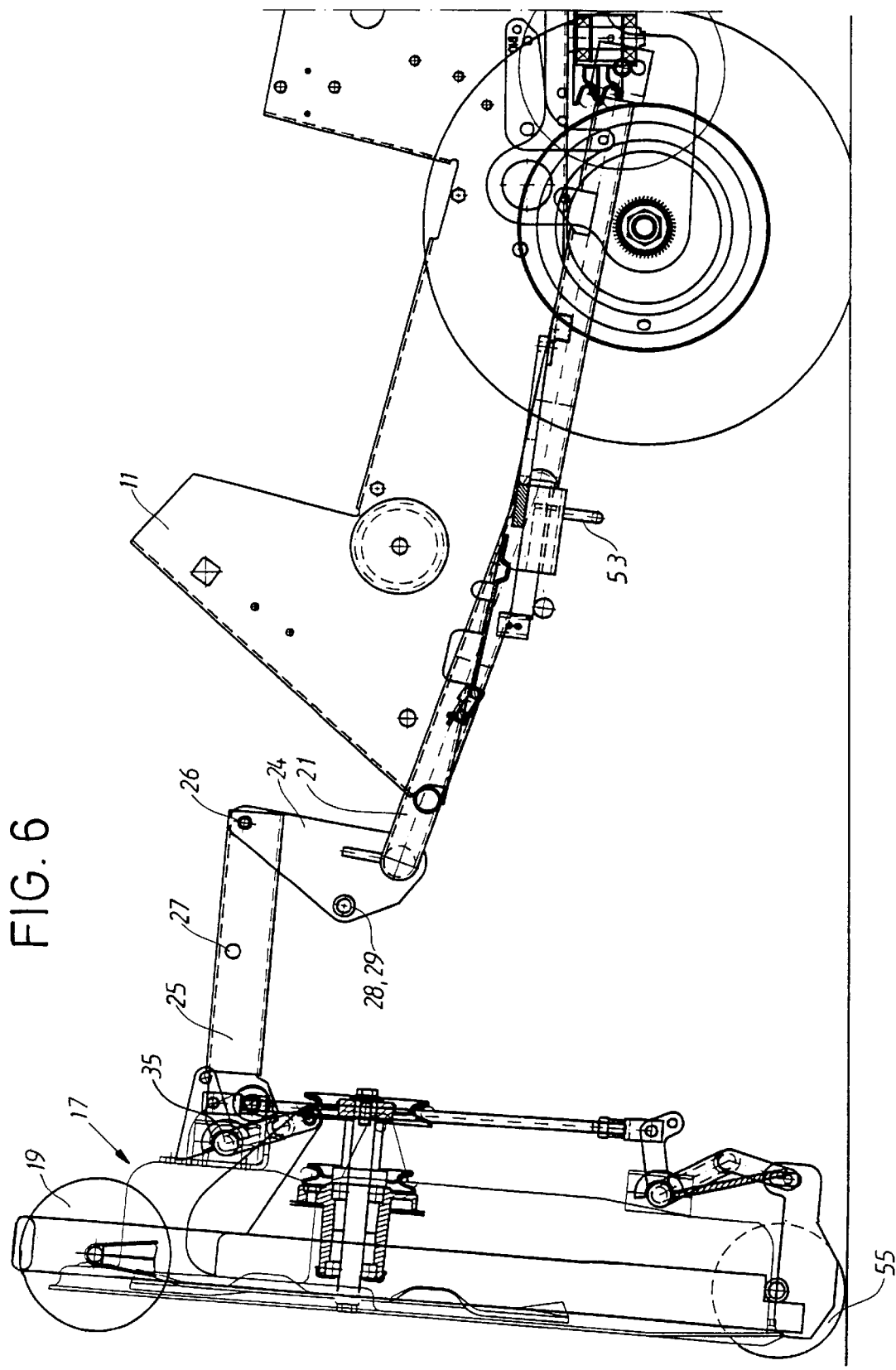

In order to undertake maintenance or cleaning of the cutting unit, the cutting unit 17 is placed in its operating position and is adjusted for the lowermost cutting height according to FIG. 3. Then the front rod 48 is removed from the rear rod 51 by removing the hook 49 from the loop 50 after which the drive belt 32 is released by moving a tensioning pulley cooperating with the drive belt to an inactive position. Then the locking pin 29 is withdrawn from the hole 27 and the opening 28 such that the two side plates 24 of the support beam 21 are released from the link arm 25. This means that the side plates 24 and the link arm 25 can be turned with respect to one another about the first pivot 26. Then the front part of the support frame 21 is pressed manually downwards towards the ground, thereby moving the rear part of the cutting unit toward the ground until the support wheels 55 engage the surface (FIG. 4). Continued depression of the support frame 21 moves the complete cutting unit forward under the influence of the link arm 25, which is turned about the first and second pivot 26, 35. This causes the tongue 54 to disengage from the support means 53.

Thereafter, the pin 29 is inserted into the openings 28 of the side plates 24 and the support frame 21 is released, which means that the support frame returns by spring action to the position shown in FIG. 4 by means of the springs 23 such that the link arm 25 will rest on the pin 29. It is now possible to manually move the rear part of the cutting unit 17 in the forward direction with the support wheels 55 in engagement with the ground. This forces the cutting unit to turn about the second pivot 35 to the position shown in FIG. 6 such that the underside of the cutting unit becomes accessible for cleaning and maintenance. In a corresponding way the mower is returned to its original position by making the above steps in reverse order.

While the preferred embodiment of the present invention is shown and described herein, it is to be understood that the same is not so limited but shall cover and include any and all modifications thereof which fall within the purview of the invention.

What is claimed is:

1. Device for a riding mower comprising a wheel borne chassis (11, 12) supporting an operator, an engine (14) for driving at least one wheel (13) and cutting means (31) arranged at a front mounted cutting unit (17) that is placed such that at least a part of the cutting unit is situated beneath the front part of the chassis, wherein the mower is provided with a first pivot (26) about which the cutting unit (17) is turnably arranged, the mower further comprising means (21, 24, 25, 26) for moving the cutting unit forward with respect to the chassis such that support means (55) arranged on a rear part of the cutting unit engage the ground and the cutting unit can be moved forward to clear the chassis, wherein the rear part of the cutting unit can then be moved forward at the same time that a front part of the cutting unit is turned upwards about said first pivot (26) to a maintenance position;

wherein said moving means comprise a first and a second link arm (21, 24 and 25) which are joined to one another by said first pivot (26), said link arms in a latched position being blocked with respect to one another by means of a latch means (29), wherein the link arms can be released when the latch means is moved from the latched position to an unlatched position making it possible to push the cutting unit forward when acting on one of the (21,24) is turnably arranged on the chassis and is under the link arms.

2. Device according to claim 1, wherein the first link arm (21,24) is turnably arranged on the chassis and is under the influence of at least one spring (23) such that the front part of the support frame is lifted by the springs.

3. Device according to claim 1, wherein the second link arm (25) is connected to the cutting unit (17) via a second pivot (35).

4. Device according to claim 3, wherein the second pivot (35) is placed at the front part of the cutting unit (17) and the second link arm (25) extends upward and rearward to the first pivot (26).

5. Device according to claim 2, wherein the second link arm (25) is connected to the cutting unit (17) via a second pivot (35).

6. Device according to claim 5, wherein the second pivot (35) is placed at the front part of the cutting unit (17) and the second link arm (25) extends upward and rearward to the first pivot (26).

* * * * *

UNITED STATES PATENT AND TRADEMARK OFFICE
CERTIFICATE OF CORRECTION

PATENT NO. : 6,341,480 B1
DATED : January 29, 2002
INVENTOR(S) : Gunnar Dahl et al.

It is certified that error appears in the above-identified patent and that said Letters Patent is hereby corrected as shown below:

<u>Title page,</u>
Item [30], Foreign Application Priority Data, please delete "9802284" and insert therefor -- 9802284-1 --;

<u>Column 1,</u>
Line 22, please delete "mower s" and insert therefor -- mower's --; and <u>Column 4,</u>
Lines 47-48, please delete "(21,24) is turnably arranged on the chassis and is under the".

Signed and Sealed this

Nineteenth Day of August, 2003

JAMES E. ROGAN
*Director of the United States Patent and Trademark Office*